No. 836,197. PATENTED NOV. 20, 1906.
C. W. MOE & C. H. NORBLOM.
EVENER.
APPLICATION FILED DEC. 14, 1905.
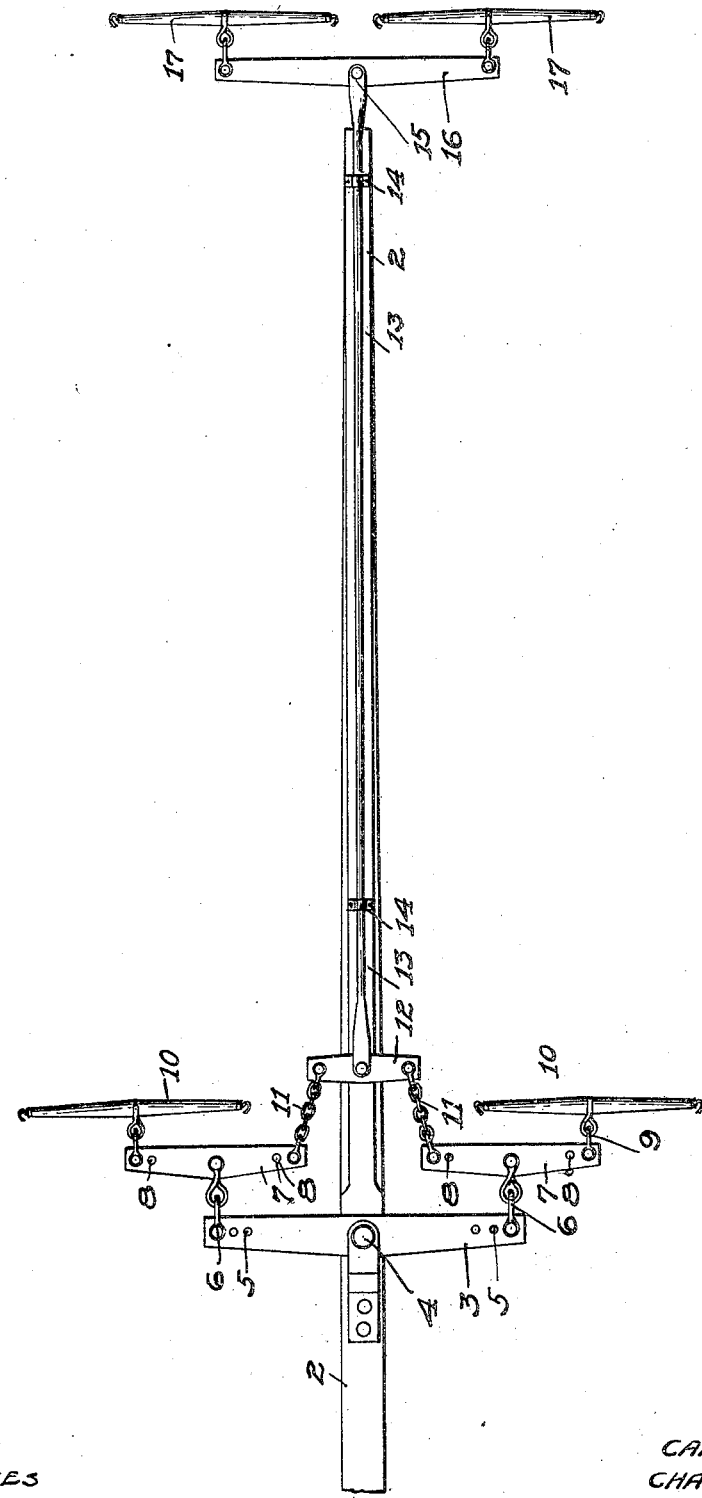
WITNESSES
INVENTORS
CARL W. MOE
CHARLES H. NORBLOM
BY
THEIR ATTORNEYS

UNITED STATES PATENT OFFICE.

CARL W. MOE AND CHARLES H. NORBLOM, OF MINNEAPOLIS, MINNESOTA.

EVENER.

No. 836,197.      Specification of Letters Patent.      Patented Nov. 20, 1906.

Application filed December 14, 1905. Serial No. 291,705.

*To all whom it may concern:*

Be it known that we, CARL W. MOE and CHARLES H. NORBLOM, of Minneapolis, Hennepin county, Minnesota, have invented certain new and useful Improvements in Eveners, of which the following is a specification.

Our invention relates to eveners or devices for equalizing the load; and the object of our invention is to provide an evener adapted particularly for a four-horse team.

The invention consists generally in various constructions and combinations, all as hereinafter described, and particularly pointed out in the claims.

In the accompanying drawing, forming part of this specification, the figure represents a draft-pole with our invention applied thereto.

In the drawing, 2 represents a pole, and 3 an evener-bar, pivoted centrally thereon at 4, and having a series of holes 5 at each end to allow the adjustment of clevises 6, to which the secondary evener-bars 7 are attached. These bars have a series of holes 8 at their outer ends to allow adjustment of the clevises 9, to which the swingletrees 10 are connected in the usual manner. Similar holes are provided at the inner ends of the bars 7 and are connected by chains 11 or other flexible means with a bar 12, which extends across the pole and is centrally pivoted to a rod 13, running lengthwise of the pole in guides 14 and having a connection 15 at its forward end with an evener-bar 16 for the swingletrees 17 of the forward team or leaders.

With this device the load will be evenly distributed between the horses. If one end of an evener is tilted forward by the horse attached thereto, the pull of the rest of the team will be applied to the other end of the evener to hold the horse back and compel the even distribution of the load.

We claim as our invention—

1. The combination with a draft-pole, of an evener-bar and its swingletrees, a secondary bar extending across the pole and connected at each end with said first-named bar, and a draft-rod attached to said secondary evener and extending to the forward end of the pole, for the purpose specified.

2. The combination with a draft-pole 2, of an evener-bar 3 pivoted thereon, evener-bars 7 connected with the ends of said bar 3, swingletrees connected with the outer ends of said bars 7, the bar 12 extending across the pole and having a flexible connection with the inner ends of said bars 7, substantially as described.

3. The combination with a draft-pole 2, of an evener-bar 3 pivoted thereon, evener-bars 7 pivotally connected with the ends of said bar 3, swingletrees attached to the outer ends of said bars 7, a bar 12 extending across the pole, means connecting the ends of said bar 12 with the inner ends of said bars 7, a draft-rod 13 pivotally connected with said bar 12 and longitudinally slidable in guides on said pole, and an evener having swingletrees attached to the forward end of said rod, substantially as described.

In witness whereof we have hereunto set our hands this 11th day of December, 1905.

CARL W. MOE.
    CHARLES H. NORBLOM.

Witnesses:
    RICHARD PAUL,
    C. MACNAMARA.